United States Patent [19]
Schneider

[11] 3,867,814
[45] Feb. 25, 1975

[54] TORQUE ENERGY CONVERTER AND STORAGE DEVICE

[76] Inventor: Theodore S. Schneider, 2065 Hatch Rd., Novato, Calif. 94947

[22] Filed: Dec. 26, 1973

[21] Appl. No.: 428,226

[52] U.S. Cl.............. 60/413, 60/468, 185/40 R, 74/572
[51] Int. Cl............. F15b 1/02, F03d 1/00
[58] Field of Search ........... 60/413, 398, 474, 325, 60/468; 74/572; 185/30, 33, 39, 40 R

[56] References Cited
UNITED STATES PATENTS

| | | | |
|---|---|---|---|
| 347,710 | 8/1886 | Houlehan | 185/33 X |
| 2,480,550 | 8/1949 | Catlin | 74/572 X |
| 3,140,703 | 7/1964 | Barr | 185/39 X |

*Primary Examiner*—Edgar W. Geoghegan
*Attorney, Agent, or Firm*—Robert R. Tipton

[57] ABSTRACT

Small increments of low force energy are applied to an hydraulic pump which drives an hydraulic motor which energy is converted to a torsional force in a spring. The potential energy in the form of a torsional force in the spring is suddenly and automatically released upon reaching a predetermined torsional force and used to increase the velocity and kinetic energy of a flywheel. A clutch is used to engage the flywheel to permit the kinetic energy stored in the flywheel to perform useful work.

7 Claims, 3 Drawing Figures

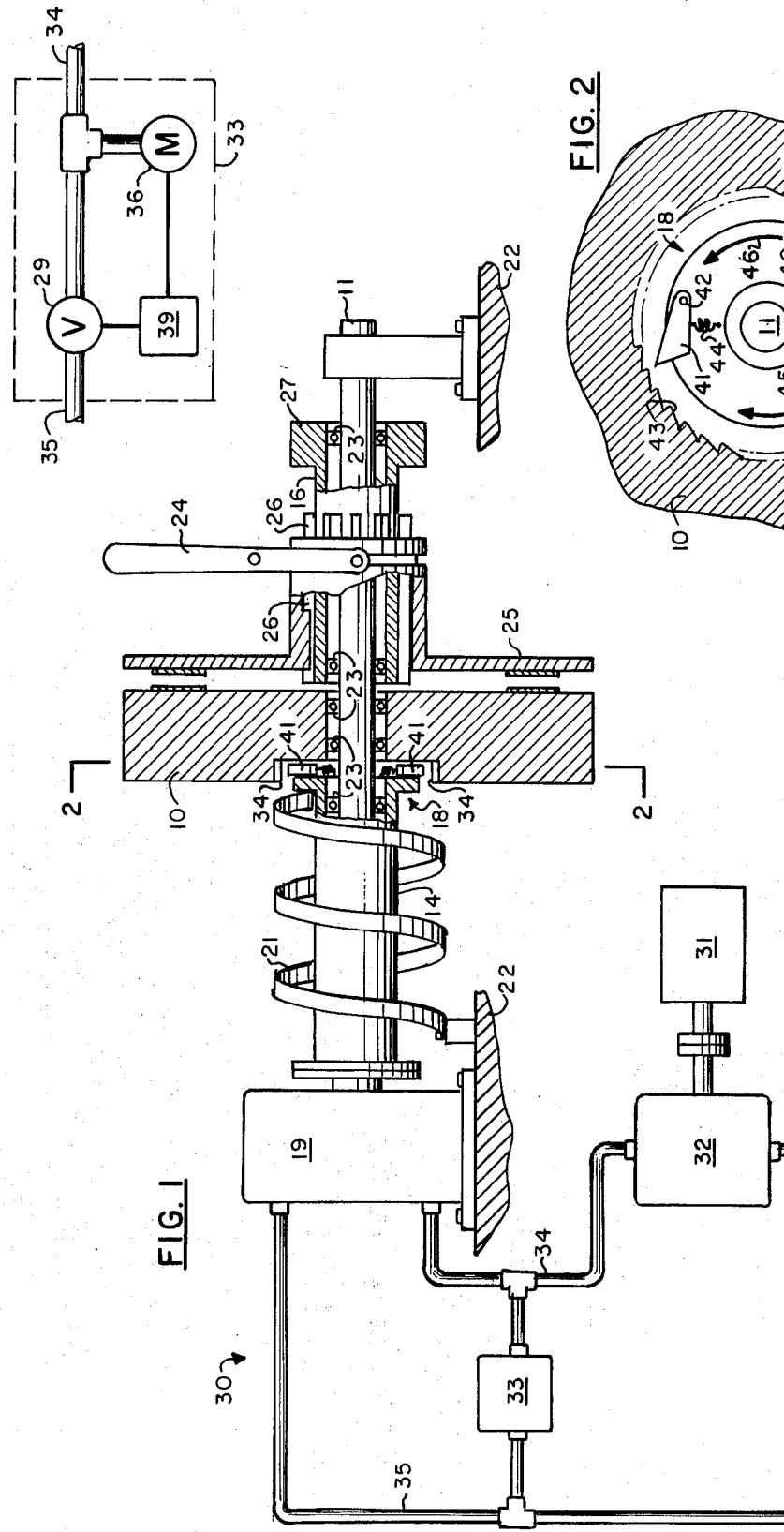
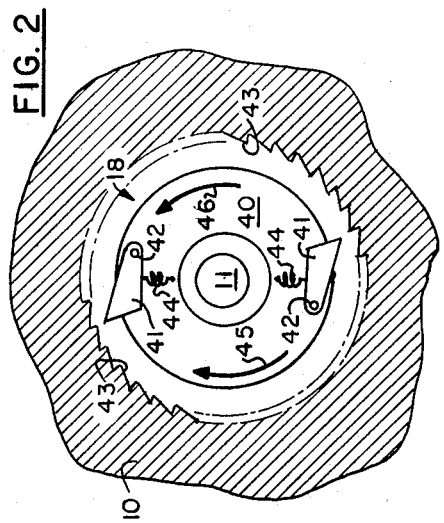

TORQUE ENERGY CONVERTER AND STORAGE DEVICE

BACKGROUND OF THE INVENTION

This invention relates generally to energy storage devices and in particular to devices for accumulating energy in small increments for later release as a large increment of energy.

The devices of the prior art that were used for the mechanical storage of energy utilized the potential energy stored in a spring or the potential energy stored in an object of a given mass being acted upon by the force of gravity, which was raised to a particular height or a combination of a mass acted upon by gravity or inertial forces geared to wind a spring.

Such devices were generally large, heavy and cumbersome and were generally mechanically complicated. In addition, they were limited to only one type of energy input into the device.

SUMMARY OF THE INVENTION

The torque energy converter and storage device of the present invention can be adapted to receive, accumulate and store energy from a variety of intermittent and small increment energy sources such as manpower, wave action, wind action, or the like, and comprises an hydraulic pump for receiving energy and applying it to operate an hydraulic motor which is used to increase the potential energy of a means for storing potential energy, such as a spring, which is combined with a means for measuring potential energy connected to a means for automatically releasing said potential energy to a flywheel upon reaching a predetermined energy level.

In basic concept, the device of the present invention takes a small force of large displacement and multiplies it to a large force of small displacement that is accumulated and stored over a period of time until a large torsional force is reached whereupon the stored force is automatically released over a short period of time to a flywheel to increase its kinetic energy.

It is, therefore, an object of the invention to provide an energy storage device.

It is a further object of the torque energy converter and storage device of the present invention to receive and accumulate energy in small and intermittent increments.

It is another object of the torque energy converter and storage device of the present invention to multiply the force of the incremental input energy.

It is still another object of the torque energy converter and storage device of the present invention to provide intermittent storage of energy in the form of potential energy.

It is still a further object of the torque energy converter and storage device of the present invention to provide a means for automatically releasing stored potential energy to a flywheel.

It is yet another object of the torque energy converter and storage device of the present invention to provide a device for storing energy in the form of kinetic energy received from a variety of mechanical energy sources.

It is yet another object of the torque energy converter and storage device of the present invention to provide a device for converting mechanical energy to potential energy which is automatically converted and stored as kinetic energy.

These and other objects of the present invention will be manifest upon study of the following detailed description when taken together with the drawings.

BRIEF DESCRIPTION OF THE DRAWINGS

FIG. 1 is a partial sectional elevational view of the energy converter and storage device of the present invention showing the main elements of the apparatus.

FIG. 2 is a view of the centrifugal clutch and flywheel taken at line 2—2 of FIG. 1.

FIG. 3 is a schematic diagram showing the relief valve in greater detail.

DESCRIPTION OF THE PREFERRED EMBODIMENT

With reference to FIG. 1, the torque energy converter and storage device of the present invention comprises, basically, a flywheel 10 which is journaled on a common shaft 11 on which is also journaled concentric shaft 14 and power take-off clutch shaft 16.

Connected to one end of concentric shaft 14 is centrifugal clutch 18 and at the other end is connected hydraulic motor 19. Also connected to concentric shaft 14 is one end of helical spring 21 whose other end is attached to base 22.

Ball bearing assemblies 23 are used throughout the apparatus to reduce the friction losses between rotating parts.

Operating lever 24 is connected to power take-off clutch 25 and is adapted to cause clutch 25 to engage flywheel 10 when power is needed. Clutch 25 is adapted to engage splines 26 on shaft 16 and be longitudinally slidable thereon. A power take-off gear or pulley 27 is attached to one end of shaft 16 from which a load may be driven.

Hydraulic motor 19, which is a part of hydraulic system 30, is driven by prime mover 31 which is mechanically connected to hydraulic pump 32.

A high pressure hydraulic fluid supply conduit 34 fluidly connects hydraulic pump 32 to hydraulic motor 19 with pressure relief valve 33 also fluidly connected and communicating with motor 19 and pump 32 through conduit 34.

It should be noted that prime mover 31 can comprise any energy source such as an electric motor, windmill, hand crank, foot peddle, wave action or the like.

A low pressure hydraulic fluid return conduit 35 connects the low pressure sides of both hydraulic motor 19 and pressure relief valve 33 to hydraulic fluid accumulator 37, while a low pressure hydraulic fluid supply conduit 38 connects accumulator 37 to the input side of hydraulic pump 32.

With reference to FIG. 2, there is illustrated a typical centrifugal clutch 18 comprising a clutch plate 40 with two or more pawls 41 connected to plate 40 by pivots 42. A plurality of ratched teeth 43 are formed in flywheel 10 which are adapted to receive pawls 41.

A spring 44 is connected to each pawl 41 and biased to hold pawls 41 inwardly when concentric shaft 14 is not rotating or rotating slowly, but not biased sufficiently to prevent pawls 41 from swinging outwardly due to centrifugal force when shaft 14 rotates rapidly or when pawls 41 are engaging teeth 43.

With reference to FIG. 3, there is shown a more detailed schematic diagram of the combination of elements making up pressure relief valve 33.

Pressure relief valve 33 comprises a pressure sensing gage 36 and a valve 29 between which is connected a pressure control unit 39. The operation of pressure relief valve is such that when a predetermined pressure in conduit 34 is reached, control unit 39 opens valve 29 and keeps it open until all fluid pressure in conduit 34 is reduced to zero, that is, until all the back pressure caused by the rotation of shaft 14 by helical spring 21 is reduced to zero.

To operate the apparatus of the present invention, power take-off clutch 25 is dissengaged from flywheel 10 and prime mover 31 is energized to cause hydraulic pump 32 to operate and pump hydraulic fluid from accumulator 37 through supply conduit 38 to pump 32 then through high pressure conduit 34 to hydraulic motor 19 causing hydraulic motor 19 to rotate concentric shaft 14 in the direction of arrow 45 (FIG. 2) and wind up helical spring 21.

As hydraulic fluid is pumped into hydraulic motor 19, the build up of tension in spring 21 will be reflected in an increase in hydraulic fluid pressure in high pressure conduit 34 at the input side of motor 19, a pressure that is measured by hydraulic fluid pressure relief valve 33.

At a predetermined hydraulic pressure level, which is directly proportional to spring tension in spring 21, and also the potential energy stored in spring 21, relief valve 33 is automatically opened to immediately release the fluid pressure in high pressure conduit 34 to conduit 35 and accumulator (reservoir) 37.

With this sudden release of hydraulic fluid pressure to motor 19, the force applied to shaft 14 by spring 21 causes shaft 14 to rotate rapidly in the direction of arrow 46.

This rapid rotation causes pawls 41 on clutch plate 40 to rotate or swing outwardly about pivot 42 and engage ratchet teeth 43 and urge flywheel 10 to either begin rotating or rotate faster in the direction of arrow 46.

It can be seen that by varying the size or pumping rate of hydraulic pump 32 the small torsional forces exerted by prime mover 31 can be multiplied through hydraulic motor 19, to exert a large torsional force on helical spring 21, depending upon the hydraulic ratio of the pump-motor combination.

Thus small, low force incremental units of energy can be accumulated into a medium force incremental unit of potential energy over a first period of time which is then converted, during a second period of time which is shorter than the first period of time, and accumulated into a large unit of kinetic energy.

I claim:

1. A torque energy converter and storage device comprising
    a flywheel,
    means for multiplying an input force comprising
    an hydraulic pump adapted to receive an input force and apply said force to an hydraulic fluid,
    an hydraulic motor adapted to exert a torsional force in proportion to the force of said hydraulic fluid, and
    a conduit system fluidly interconnecting said hydraulic pump and said hydraulic motor,
    means for storing said multiplied force, and
    means for automatically applying forces stored in said means for storing said multiplied force to said flywheel upon reaching a predetermined level of multiplied force.

2. The torque energy converter and storage device as claimed in claim 1 wherein said means for storing said multiplied force comprises
    a spring.

3. The torque energy converter and storage device as claimed in claim 1 wherein said means for automatically applying forces stored in said means for storing said multiplied force to said flywheel comprises
    a centrifugal clutch connected to said means for storing said multiplied force and adapted to rotatably engage said flywheel,
    means for measuring the force in said means for storing said multiplied force, and
    means for automatically releasing said stored force in said means for storing said multiplied force upon reaching a predetermined force to rotate said centrifugal clutch and engage said flywheel.

4. The torque energy converter and storage device as claimed in claim 1
    wherein said means for automatically applying forces stored in said means for storing said multiplied force comprises
    a centrifugal clutch connected to said hydraulic motor and adapted to rotatably engage said flywheel, and
    means for automatically releasing hydraulic fluid back pressure from said hydraulic motor, connected in said hydraulic system, upon reaching a predetermined force stored in said means for storing said multiplied force.

5. The torque energy converter and storage device as claimed in claim 4 wherein said means for automatically releasing hydraulic fluid back pressure comprises
    a relief valve connected in said hydraulic system.

6. The torque energy converter and storage device as claimed in claim 5 wherein said relief valve comprises
    a valve,
    means for measuring hydraulic fluid back pressure in said hydraulic system, and
    means for opening said valve upon measuring a predetermined hydraulic fluid back pressure.

7. The torque energy converter and storage device as claimed in claim 6 wherein said means for opening said valve comprises
    means for opening said valve during the time period that said centrifugal clutch is rotatably engaged with said flywheel.

* * * * *